United States Patent [19]
Pawelzik et al.

[11] Patent Number: 4,997,005
[45] Date of Patent: Mar. 5, 1991

[54] SINGLE-LEVER MIXING VALVE

[75] Inventors: Manfred Pawelzik, Soest; Horst Titze, Hagen, both of Fed. Rep. of Germany

[73] Assignee: Friedrich Grohe Armaturenfabrik GmbH & Co., Hemer, Fed. Rep. of Germany

[21] Appl. No.: 467,870

[22] Filed: Jan. 22, 1990

[30] Foreign Application Priority Data

Feb. 10, 1989 [DE] Fed. Rep. of Germany ....... 3903999

[51] Int. Cl.$^5$ ............................................. F16K 11/02
[52] U.S. Cl. ............................ 137/625.17; 137/625.4
[58] Field of Search ......................... 137/625.17, 625.4

[56] References Cited

U.S. PATENT DOCUMENTS

| | | | |
|---|---|---|---|
| 3,920,043 | 11/1975 | Fowell . | |
| 4,540,023 | 9/1985 | Pawelzik | 137/625.17 |
| 4,617,965 | 10/1986 | Lorch | 137/625.17 |
| 4,621,659 | 11/1986 | Pawelzik | 137/625.17 |
| 4,657,045 | 4/1987 | Kitamura | 137/625.17 X |

FOREIGN PATENT DOCUMENTS

| | | |
|---|---|---|
| 381156 | 9/1986 | Austria . |
| 3211618 | 10/1983 | Fed. Rep. of Germany ... 137/625.4 |
| 3244121 | 5/1984 | Fed. Rep. of Germany . |
| 3428286 | 2/1986 | Fed. Rep. of Germany . |
| 3503793 | 8/1986 | Fed. Rep. of Germany . |

Primary Examiner—Gerald A. Michalsky
Attorney, Agent, or Firm—Herbert Dubno; Andrew Wilford

[57] ABSTRACT

A mixing valve comprises a housing centered on a housing axis, a base plate formed with an outlet port bisected by a symmetry plane including the housing axis and a pair of arcuate inlet ports offset from the outlet port and symmetrically flanking the plane. The ports open on the base plate at a planar front surface perpendicular to the axis and plane. A control plate has a back surface lying on the base-plate front surface and is formed with a cavity opening at the back surface at a rim. A lever is mounted on the housing and control plate for moving the control plate parallel to the symmetry plane from a closed position with the cavity over the outlet but not over either of the inlets to an open position with the cavity over the outlet port and at least one of the inlet ports and transverse to the symmetry plane to vary the coverage of the inlet ports while still being over the outlet port. The cavity opens at the back surface at a rim having a generally elliptical shape and having a major axis parallel in the closed position to the symmetry plane. In addition the inlet ports have on the front surface substantially circularly arcuate inner edges having a common center of curvature.

7 Claims, 7 Drawing Sheets

SINGLE-LEVER MIXING VALVE

SPECIFICATION

1. Field of the Invention

The present invention relates to a mixing valve. More particularly this invention concerns such a valve which has a single control lever.

2. Background of the Invention

A standard single-lever mixing valve has a normally cylindrical housing centered on an axis and a bottom plate closing one end of the housing and formed with a hot-water inlet port, a cold-water inlet port, and an outlet port. The two inlet ports are normally situated to one side of a diametral plane dividing the bottom plate in half and are both of arcuate ring-segment shape, centered normally on a common axis. A control plate sits flatly atop this bottom plate and is formed with a cavity that normally overlies the outlet port and that can also be brought into registration over the inlet ports, either singly or jointly. A lever pivoted on the housing is connected to this control plate to slide it atop the bottom plate, thereby determining the amount of overlap of the control-plate cavity with the inlets to determine the amounts of hot and cold water to be shunted through this cavity to the outlet port.

As described in my U.S. Pat. Nos. 4,540,023 and 4,621,659 the control plates of such valves open on the valve plates at a mouth having a rim that is generally oblong. In addition the outlet port is situated on one half of the valve plate and the inlet ports on the opposite half. As a result the front-to-back stroke that determines overall flow volume and the side-to-side stroke that determines output temperature must be relatively long. Unfortunately this extra size must be in the very parts that are above the counter in what are normally relatively stylish settings, where architectural taste would normally require a slimmer fixture.

Another problem with the known systems is that the angular stroke for adjusting from full hot to full cold is relatively short, typically less than 90°. This makes fine adjustment of the water temperature difficult.

OBJECTS OF THE INVENTION

It is therefore an object of the present invention to provide an improved single-lever mixing faucet.

Another object is the provision of such an improved single-lever mixing faucet which overcomes the above-given disadvantages, that is which is of relatively small dimensions and which can have a relatively long angular adjustment stroke.

SUMMARY OF THE INVENTION

The instant invention is an improvement on a mixing valve has a generally cylindrical housing centered on a housing axis and a base plate in the housing formed with an outlet port bisected by a symmetry plane generally including the housing axis and a pair of arcuate inlet ports offset from the outlet port and generally symmetrically flanking the plane. The ports open on the base plate at a planar front surface substantially perpendicular to the axis and plane. A control plate has a back surface lying on the base-plate front surface and formed with a cavity opening at the back surface at a rim. A lever is mounted on the housing and control plate for moving the control plate parallel to the symmetry plane from a closed position with the cavity over the outlet but not over either of the inlets to an open position with the cavity over the outlet port and at least one of the inlet ports and transverse to the symmetry plane to vary the coverage of the inlet ports while still being over the outlet port. According to the invention the cavity opens at the back surface at a rim having a generally elliptical shape and having a major axis parallel in the closed position to the symmetry plane. In addition the inlet ports have on the front surface substantially circularly arcuate inner edges having a common center of curvature. Furthermore the rim is formed with a generally part-circular inlet lobe engageable over the inlet ports in the open position and centered on the center of curvature of the inlet-port edges in the closed position of the control plate with the major axis lying on the symmetry plane.

With this arrangement the inlet and outlet passages can be much closer to one another so that the valve dimensions can be reduced considerably. The result is an extremely slim structure that can be quite attractive and unobtrusive.

According to other features of this invention the valve plate is centered on an axis lying on the plane and the center of curvature of the inlet-port edges is offset along the axis away from the inlet ports from the valve-plate center axis. The offset can be about 0.8 mm.

In accordance with a further invention feature the inlet lobe is formed of a pair of concentric and circularly arcuate side sections symmetrically flanking the major axis, a circularly arcuate end section between the side sections and symmetrically bisected by the major axis, and a pair of respective straight sections extending at about 25° to the major axis and each connecting a respective side section with the end section. More particularly the rim has an outlet lobe engageable over the outlet port and formed of a generally semicircular section bisected by the major axis and of generally the same radius of curvature as the outlet port and a pair of straight sections generally parallel to and symmetrically flanking the major axis and connecting the semicircular section to the side sections of the inlet lobe.

These input ports are formed as slots of width decreasing away from the major axis by about 0.5 mm. The inlet-port inner edges have a radius of curvature of about 7.5 mm and the cavity has at its rim measured perpendicular to the major axis a maximum dimension of about 11.8 mm. In addition the inlet lobe has a part-circular end section bisected by the major axis and offset by about 1.8 mm from the center of curvature of the inlet-port edges and of a radius of curvature equal to about 6.5 mm and the inlet lobe has a pair of part-circular side sections symmetrically flanking the major axis, having a center of curvature lying on the main axis offset by about 2.1 mm to the center of curvature of the inlet-port edges, and having a radius of curvature of about 6.5 mm. Moreover the rim has an outlet lobe engageable over the outlet port and having a part-circular rim bisected by the major axis, having a center of curvature offset by about 4 mm from the center of curvature of the inlet-port edges, and having a radius of curvature of about 4 mm.

In accordance with a further feature of this invention the cavity is only generally elliptical at the back face and the inlet lobe is formed as a half ellipse and acts as a control edge for the inlet ports. Finally the generally elliptical rim has a minor axis perpendicular to the major axis, the major axis having being about 12.4 mm long and the minor axis about 11.8 mm long.

With this arrangement it is possible at a pressure p of about 3 bar to achieve a throughflow Q of at least 20 liter/minute. The angular stroke of the lever is more than 90° for very fine temperature adjustment and the plate overlap can be at least 1 mm. The valve can be very quiet and can be operated with a very light force. The housing can be about 37 mm less in diameter than in standard systems, for a very slim and attractive structure, as the middle part between the various ports is reduced to a very small size.

DESCRIPTION OF THE DRAWING

The above and other objects, features, and advantages will become more readily apparent from the following, reference being made to the accompanying drawing in which.

SPECIFIC DESCRIPTION

Figure 1:
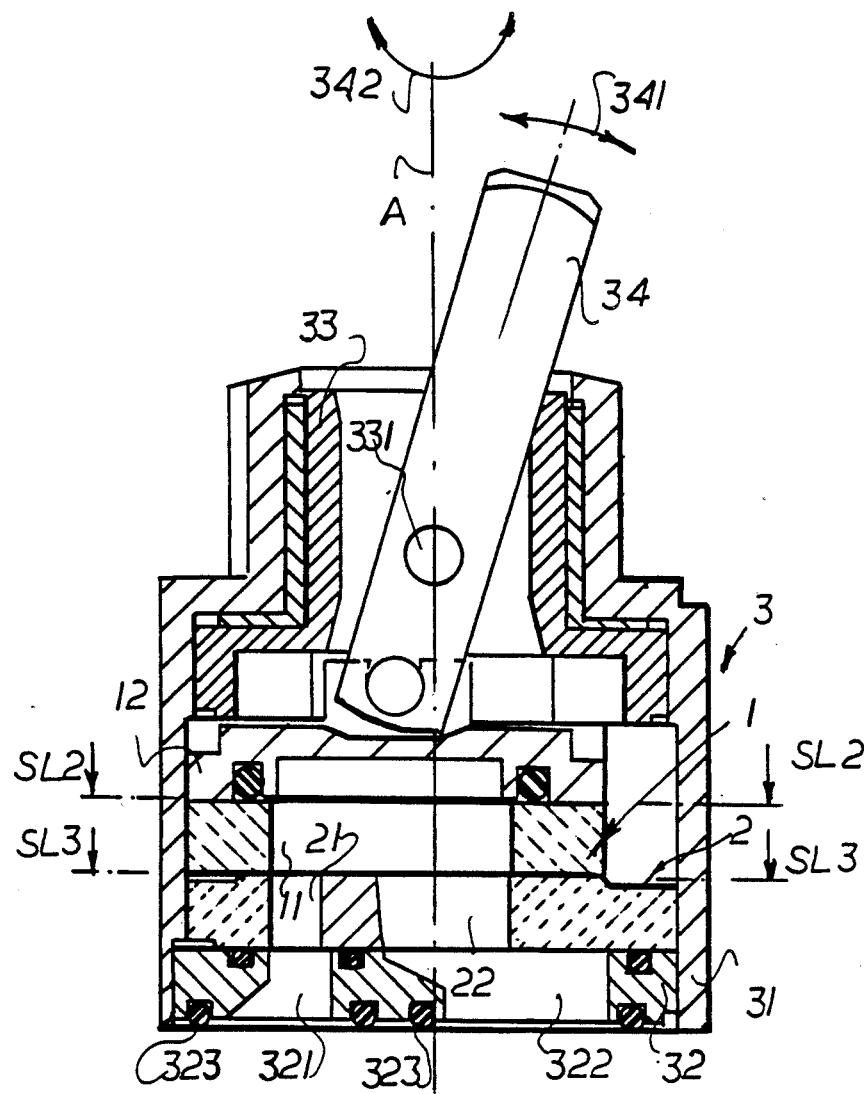
FIG. 1 is a vertical axial section through the valve according to this invention.

As seen in the drawing a mixing valve according to this invention has a housing 3 centered on a normally vertical axis A and comprising a stepped cylindrical sleeve 31 that is downwardly closed by a normally fixed disk 32. The disk 32 is formed with a pair of inlet openings 321 respectively connected to hot- and cold-water supplies and an outlet opening 322 that runs to the faucet connected to this valve. Seals 323 are provided around these openings 321 and 322. The upper side of the housing 3 is provided with a sleeve 33 that can pivot in the housing 3 about the axis A as indicated by arrow 342 and that supports on a pivot 331 a lever 34 that can also be swung back and forth as indicated by arrow 341.

Sitting fixedly on the top or front surface of the plate 32 is a valve disk or plate 2 formed with a pair of arcuate slot-like inlet ports 21 communicating with the openings 321 and with a circular central outlet port 22 communicating with the opening 322.

Sitting atop this plate 2 is a control plate 1 formed with a central cavity 11 closed upwardly by a cap 12 on which the lower end of the lever 34 is pivoted. The plates 11 and 2 at least are made of a ceramic and have highly polished confronting and engaging faces so that the plate 1 can slide easily on the plate 2. As is known, movement of the lever back and forth as indicated by arrow 341 controls the volume of flow from the inlet ports 21 to the outlet port 22 and movement in the direction of arrow 342 controls the temperature, that is the amount of mixing of hot and cold water from the inlet ports 21 to the outlet port 22.

Figure 3:
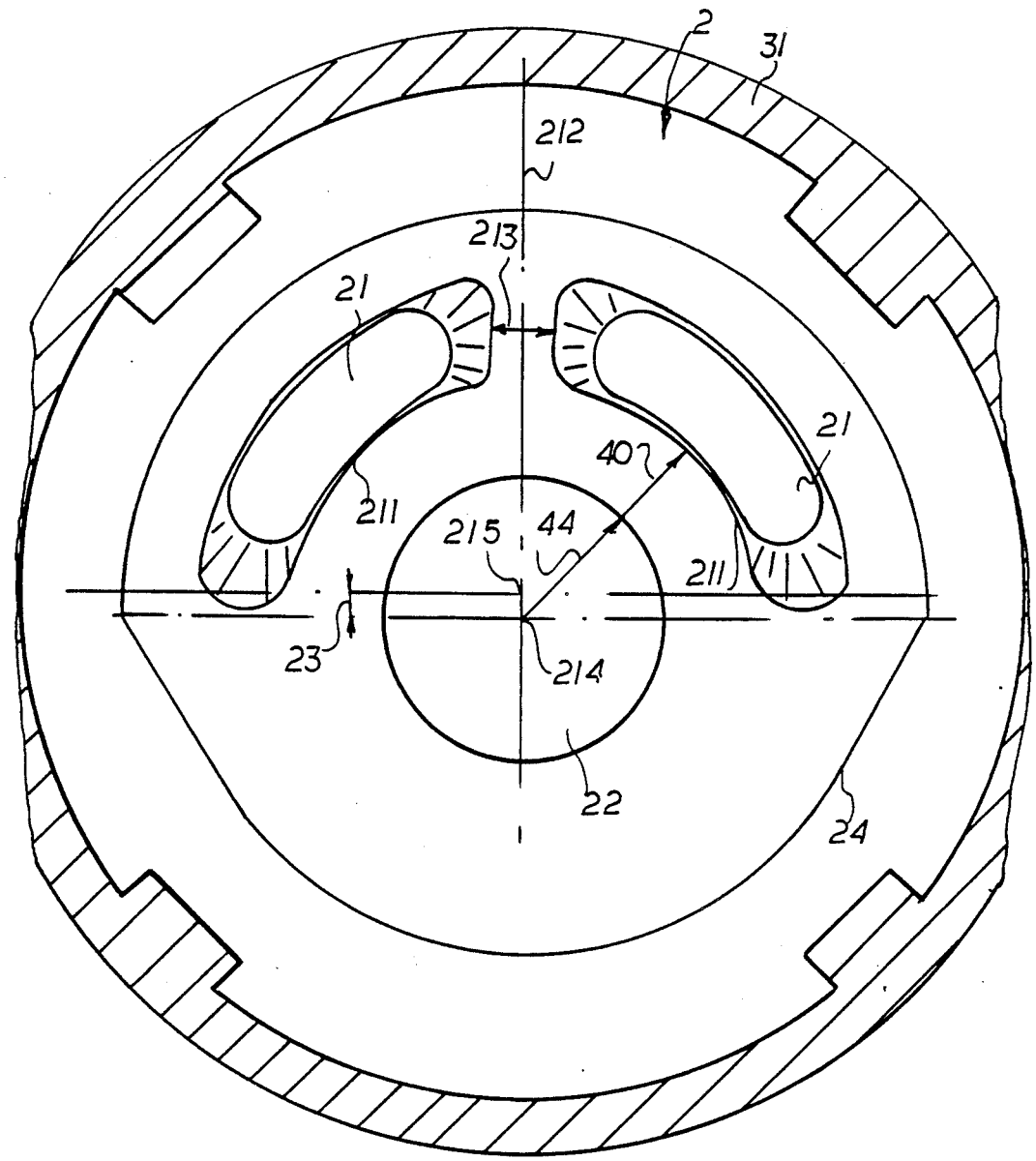

As seen in FIG. 3 the outlet port 22 formed in the stationary valve plate 2 is of circular shape and the two inlet ports 21 are shaped as ring segments and have inner edges 211 of a radius of curvature 40 and a center of curvature 214 that corresponds to the center of the port 22. This centerpoint 214 is offset by a distance 23 of 0.8 mm from a centerpoint 215 of the plate 2. These centers 214 and 215 lie on a diametrical symmetry plane 212 of the plate 2. The inlet openings 21 flare somewhat against the downward flow direction through them and are tapered from their ends adjacent the plate 212 to their opposite outer ends by about 0.5 mm. The radius 40 of the inner edges 211 is about 7.5 mm while the opening 22 has a radius 44 of about 4 mm. The adjacent edges of the openings 21 are spaced from each other by a distance 213 of about 2 mm. The maximum radial widths of the openings 21 is about 3.5 mm and they are rounded to about 1 mm in their corners.

Figure 2:
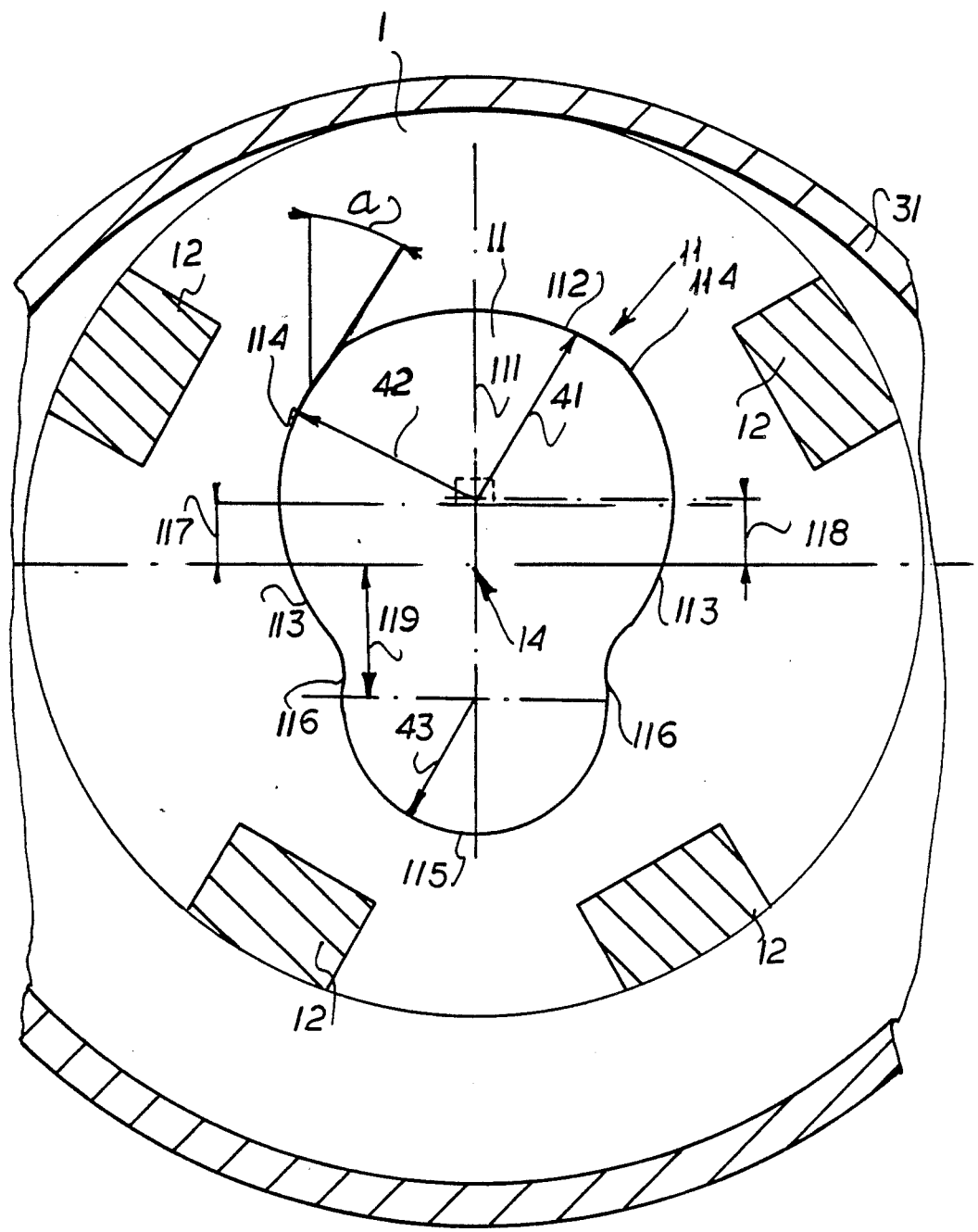
FIGS. 2 and 3 are sections taken along respective lines SL2—SL2 and SL3—SL3 of FIG. 1.

FIG. 2 shows the smaller-diameter and movable control plate 1 in more detail. The plate 1 is centered on an axis or point 14 that is included in its major axis or symmetry plane 111 that bisects the elongated cavity 11. In a region corresponding to the inlet ports 21 the cavity 11 has a large-diameter inlet lobe that is formed by an end section 112 of circularly arcuate shape symmetrical to and bisected by the plane 111, by a pair of side sections 113 that symmetrically flank the plane 111, and by a pair of straight sections 114 that connect the outer ends of the section 112 with the sections 113. The end section 112 has a radius of curvature 41 equal to 6.5 mm, centered on the plane 111, and spaced by a distance 117 of 1.8 mm from the center 14. The sections 113 have radii of curvature 42 that are also equal to 6.5 mm but have centers lying at a spacing 118 of 2.1 mm from the center 14. The straight sections 114 extend at an angle a of 25° to the plane 111.

At its opposite end over the outlet opening 22 the cavity 11 has a small-diameter lobe with a semicircular section 115 of a radius of curvature 43 centered on the plane 111 and 4 mm long. The center of curvature of this section 115 is spaced by a distance 119 of 4 mm from the center 14 and straight sections 116 parallel to the plane 111 join the ends of the section 15 to the ends of the side sections 113.

Figure 4:
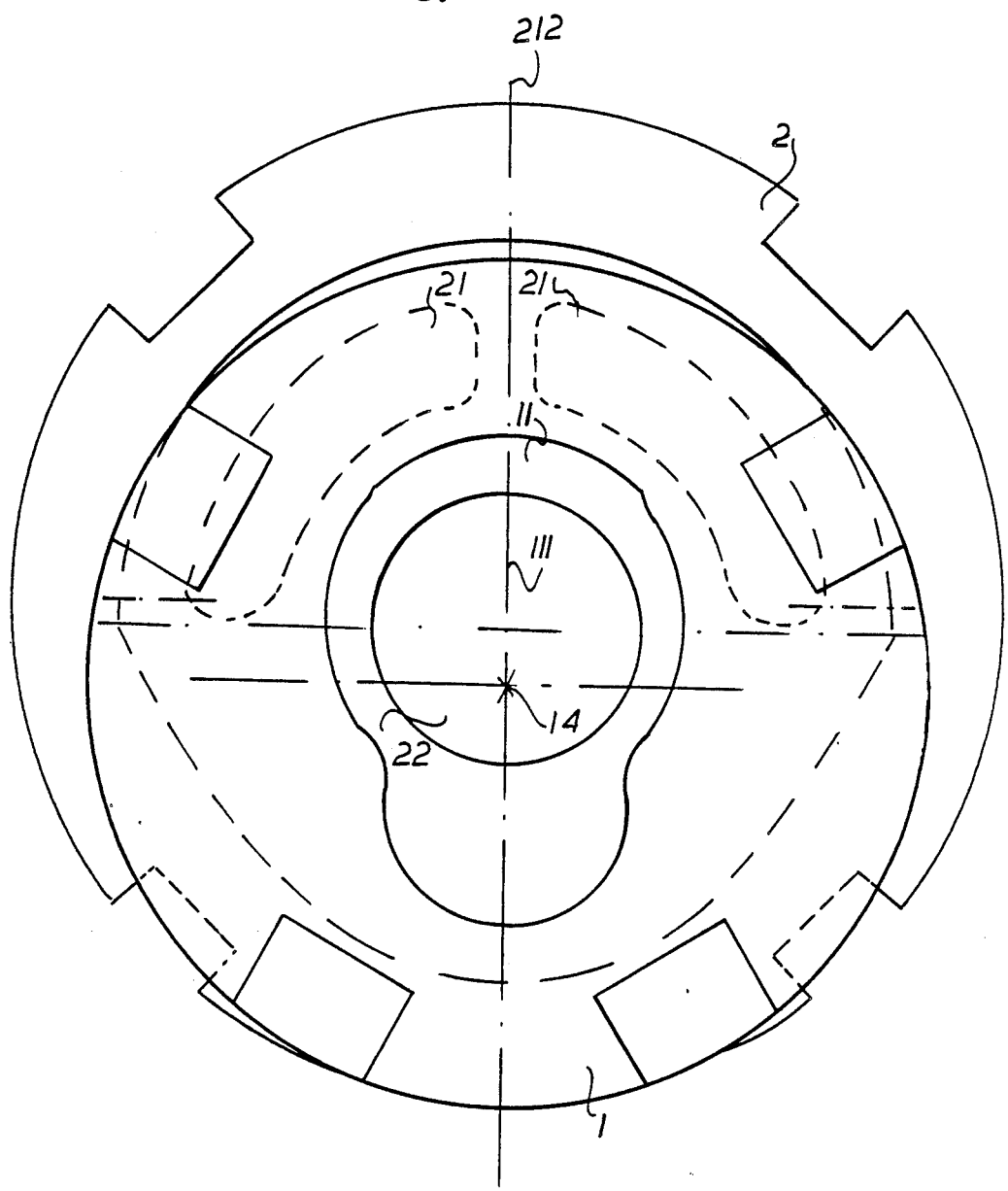
FIG. 4 is top view of the valve plates taken along the section plane of FIG. 2 and showing the valve in the closed position.
Figure 5:
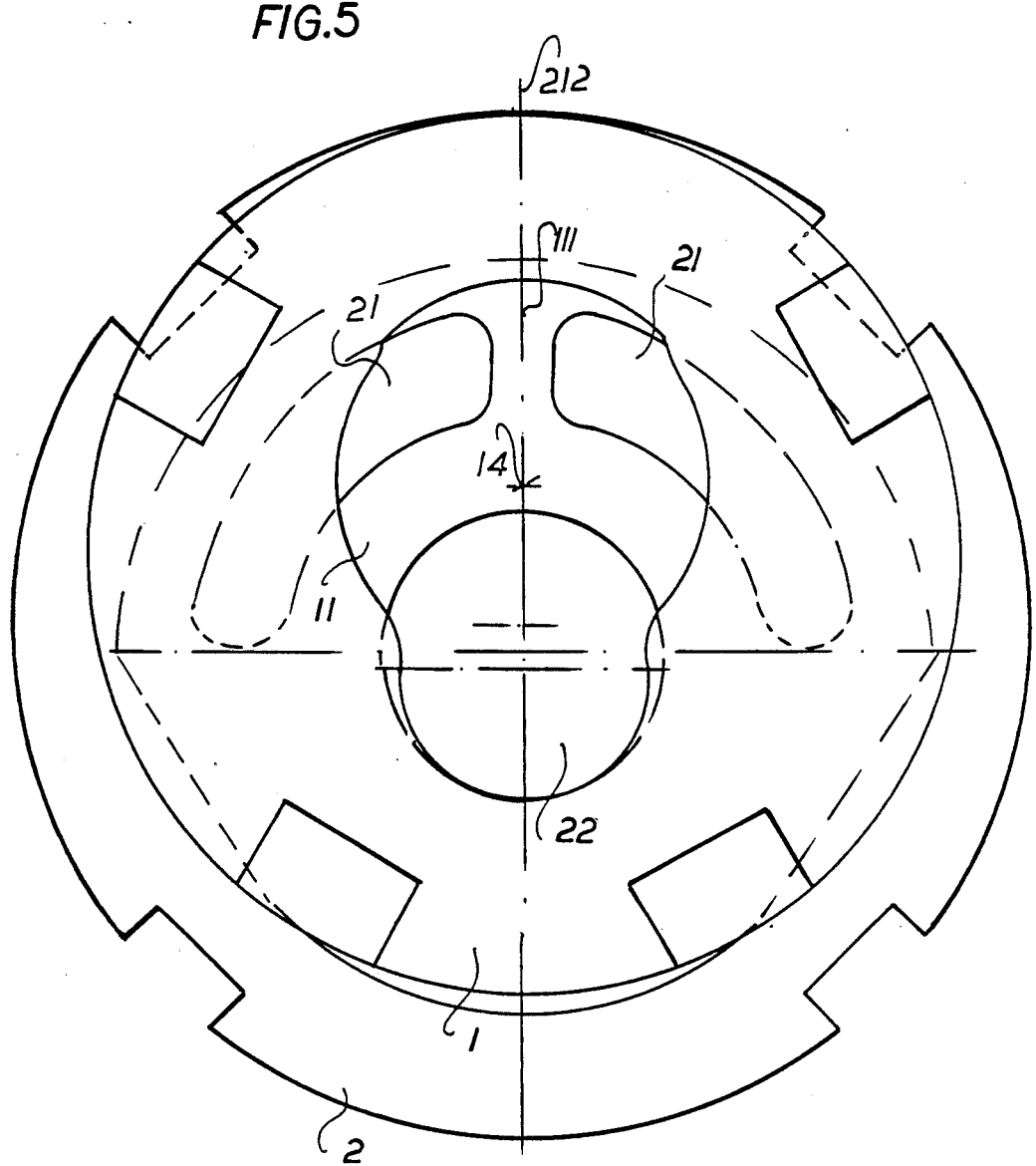
FIG. 5 is a view like FIG. 4 but showing the valve in the open position outputting warm water.
Figure 6:
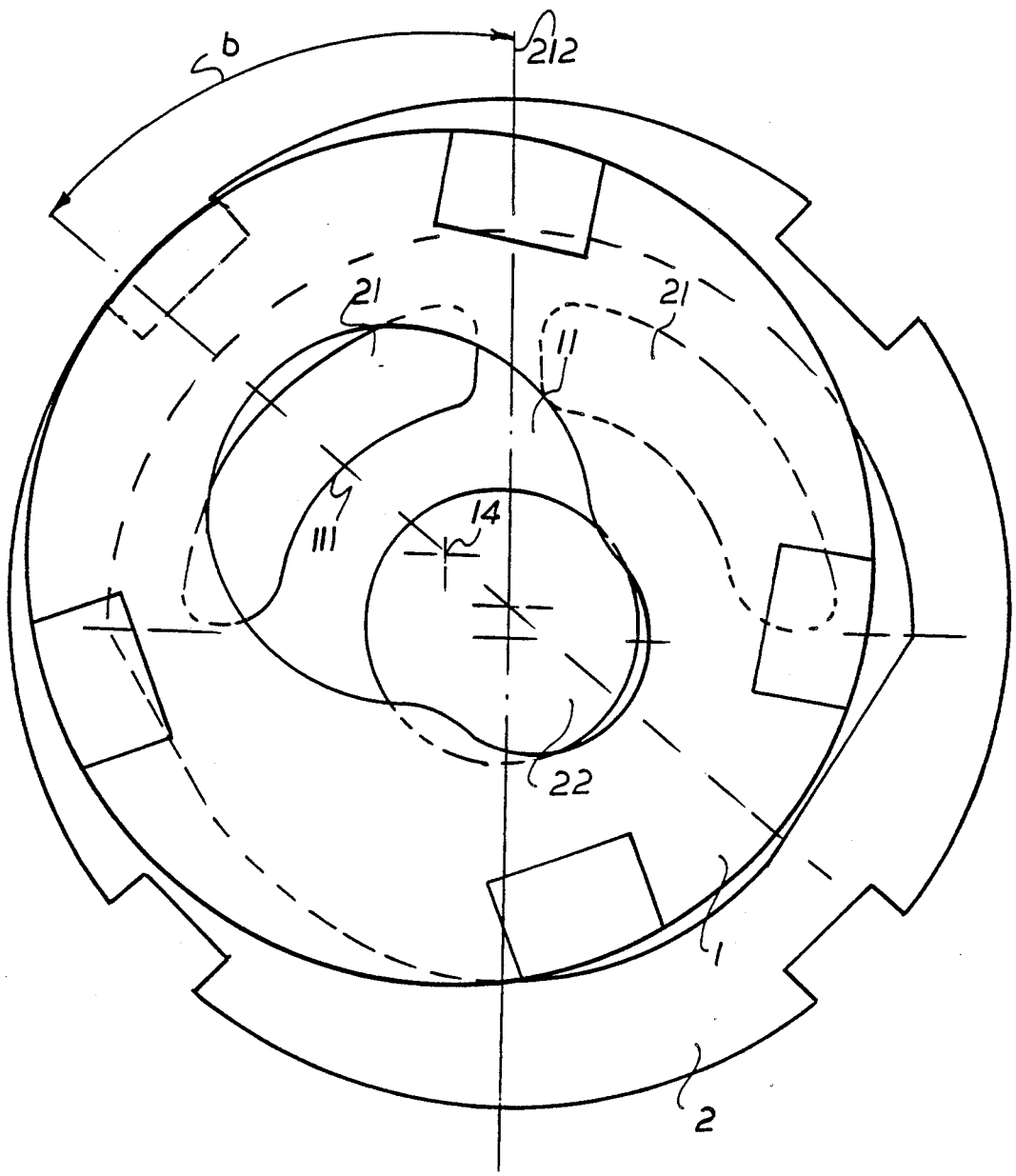
FIG. 6 is a view like FIG. 4 but showing the valve in the open position outputting hot water.

FIGS. 4 through 6 show the various positions the control plate 1 can assume on the valve plate 2. FIG. 4 shows the valve in the closed position. Here the symmetry plane 212 and the major axis 111 coincide with each other and there is no flow through the valve as the cavity 11 does not overlap either of the ports 21.

In FIG. 5 the plane 212 and axis 111 still coincide but the plate 1 has been shifted on the plate 2 so that the cavity 11 overlaps the two ports 21, allowing flow from these ports 21 out the port 22.

In FIG. 6 the plate 11 has been pivoted through an angle b equal to 50° toward one of the inlet ports 21 so that there is flow only from this one inlet port 21 to the outlet port 22 and flow from the other inlet port 21 is blocked. Clearly the entire angle of swing from the full-hot to the full-cold position is equal to 2b or 100°. While in either of these end positions or any intermediate position it is still possible to move the control plate 1 parallel to the plane 212 and thereby vary the amount of flow to the outlet port 22.

Figure 7:
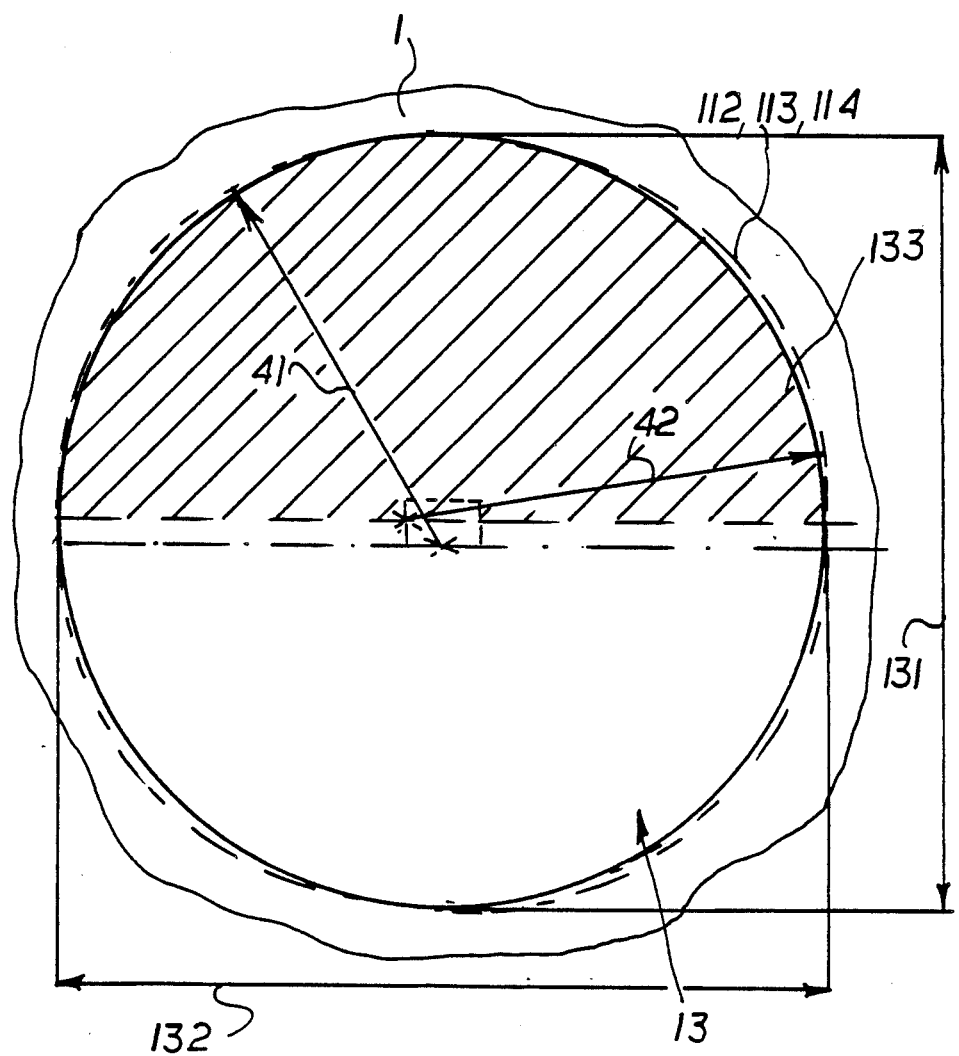
FIG. 7 is a diagrammatic view of another valve arrangement according to this invention.

Finally FIG. 7 shows a control plate 1 wherein a flow cavity 13 is formed as a pure ellipse 133. This ellipse has a main axis 131 of 12.4 mm and a minor axis 132 of 11.8 mm. For better outflow of tempered water the outlet opening 22 is preferably in the center of the valve plate 2 and is not circular in shape. With this cavity 13 the main lobe of the ellipse works with the inlet openings 21 and a second main lobe with the outlet opening 22. Alternatively instead of a purely elliptical form of the cavity 13 as shown in dashed lines it is possible for it to be formed of circular arcs 112, 113 and of the straight sections 114 inclined at an angle of 25° to the main axis 131. As can be seen in the drawing the flow cross section of the cavity formed of circular arcs is greater by about 2% than a purely elliptical shape. Thus a flow cavity formed of circular arcs and straight lines can have a greater throughput capacity.

I claim:

1. In a mixing valve comprising:

a generally cylindrical housing centered on a housing axis;

a base plate in the housing formed with an outlet port bisected by a symmetry plane generally including the housing axis and a pair of arcuate inlet ports offset from the outlet port and generally symmetrically flanking the plane, the ports opening on the base plate at a planar front surface substantially perpendicular to the axis and plane;

a control plate having a back surface lying on the base-plate front surface and formed with a cavity opening at the back surface at a rim; and means including a lever mounted on the housing and control plate for moving the lever parallel to the symmetry plane from a closed position with the cavity over the outlet but not over either of the inlets to an open position with the cavity over the outlet port and at least one of the inlet ports and transverse to the symmetry plane to vary the coverage of the inlet ports while still being over the outlet port; the improvement wherein the rim of the control-plate cavity is of elongated keyhole shape symmetrical to and having a major axis parallel in the closed position to the symmetry plane, the inlet ports have on the front surface substantially circularly arcuate inner edges having a common center of curvature, the rim is formed with a generally part-circular large-diameter inlet lobe engageable over the inlet ports in the open position and centered on the center of curvature of the inlet-port edges in the closed position of the control plate with the major axis lying on the symmetry plane, and with a generally part-circular small-diameter outlet lobe having a center of curvature lying on the major axis offset away from the inlet ports from the center of curvature of the inlet lobe, and the inlet lobe is formed of a pair of concentric and circularly arcuate side sections symmetrically flanking the major axis, a circularly arcuate end section between the side sections and symmetrically bisected by the major axis, and a pair of respective straight sections extending at about 25° to the major axis and each connecting a respective side section with the end section.

2. The improved mixing valve defined in claim 1 wherein the valve plate is centered on an axis lying on the plane and the center of curvature of the inlet-port edges is offset along the axis away from the inlet ports from the valve-plate center axis.

3. The improved mixing valve defined in claim 2 wherein the valve-plate axis is offset from the center of curvature of the inlet-port edges by about 0.8 mm.

4. The improved mixing valve defined in claim 1 wherein the rim has an outlet lobe engageable over the outlet port and formed of a generally semicircular section bisected by the major axis and of generally the same radius of curvature as the outlet port, and a pair of straight sections generally parallel to and symmetrically flanking the major axis and connecting the semicircular section to the side sections of the inlet lobe.

5. The improved mixing valve defined in claim 1 wherein the input ports are formed as slots of width decreasing away from the major axis.

6. The improved mixing valve defined in claim 1 wherein the inlet-port inner edges have a radius of curvature of about 7.5 mm, the cavity has at its rim measured perpendicular to the major axis a maximum dimension of about 11.8 mm, the end section is offset by about 1.8 mm from the center of curvature of the inlet-port edges and of a radius of curvature equal to about 6.5 mm, the side sections have a center of curvature lying on the main axis offset by about 2.1 mm to the center of curvature of the inlet-port edges, and having a radius of curvature of about 6.5 mm, the rim has an outlet lobe engageable over the outlet port and having a part-circular rim bisected by the major axis, having a center of curvature offset by about 4 mm from the center of curvature of the inlet-port edges, and having a radius of curvature of about 4 mm.

7. The improved mixing valve defined in claim 1 wherein the inlet lobe acts as a control edge for the inlet ports.

* * * * *